United States Patent [19]

Meek

[11] Patent Number: 4,525,755
[45] Date of Patent: Jun. 25, 1985

[54] APPARATUS FOR RECORDING AND PLAYING BACK MAGNETIC TAPE CASSETTES AND THE LIKE

[75] Inventor: Thomas Meek, Hull, England

[73] Assignee: Norwood Industries, Inc., Salt Lake City, Utah

[21] Appl. No.: 59,274

[22] Filed: Jul. 19, 1979

[51] Int. Cl.³ .................. G11B 15/12; G11B 5/45; G11B 15/46
[52] U.S. Cl. .................................. 360/63; 360/65; 360/73
[58] Field of Search .................. 360/73, 65, 63, 61

[56] References Cited

U.S. PATENT DOCUMENTS

| | | | |
|---|---|---|---|
| 3,315,041 | 4/1967 | Sampson | 360/63 |
| 3,465,321 | 9/1969 | Reisfeld | 360/65 |
| 3,685,171 | 8/1972 | Kosaka | 35/35 |
| 3,855,619 | 12/1974 | Karl et al. | 360/73 |
| 3,877,070 | 4/1975 | Takenouchi et al. | 360/63 |
| 4,086,635 | 4/1978 | Saitou | 360/63 |
| 4,124,873 | 11/1978 | Satoh et al. | 360/73 |
| 4,215,377 | 7/1980 | Norris | 360/73 |

FOREIGN PATENT DOCUMENTS 1330024 5/1971 Japan.

OTHER PUBLICATIONS

"Electronic Circuits Manual", by John Markus, McGraw Hill Book Co., 1971, pp. 381, 385 & 387.
Advertisement of "Electric Book of America", 1976.

Primary Examiner—Vincent P. Canney
Attorney, Agent, or Firm—Mallinckrodt, Mallinckrodt, Russell & Osburn

[57] ABSTRACT

A record and playback apparatus for use with magnetic tape cassettes and the like can be switched between the normal two track cassette format for either record or playback or single track format for either record or playback. The apparatus provides optimum record and bias signals to the record head gaps being used regardless of whether two record head gaps are used for standard format or a single record head gap is used for single track format. The apparatus also preferably includes motor speed switching and regulating circuitry so that the apparatus can be satisfactorily operated at normal cassette speed or at a reduced speed, preferably one quarter that of normal speed. Switching of play and record equalization as well as record bias is also preferably included with the speed switching.

10 Claims, 6 Drawing Figures

APPARATUS FOR RECORDING AND PLAYING BACK MAGNETIC TAPE CASSETTES AND THE LIKE

BACKGROUND OF THE INVENTION

1. Field

The invention is in the field of recording and playback apparatus for magnetic tape cassettes or the like.

2. State of the Art

Since the introduction of tape cassettes a number of years ago, the cassette format for magnetic tape has become very popular and a wide variety of equipment is available for recording and playing back tape cassettes and for playing pre-recorded monophonic and stereophonic tape cassettes. An important area of use for cassette equipment is in the recording and playback of the spoken word. This may be for educational purposes, such as tapes of lectures, conferences, readings of textbooks, etc., or for entertainment, such as the reading of plays and novels. Such tapes are usually monophonic and do not require high fidelity sound reproduction. The important considerations are the convenience of the cassette format and the amount of material that can be put onto a cassette.

Most cassette record and playback equipment available is designed to operate at one standard speed, and most pre-recorded cassettes are designed to be played at that one standard speed. Also, it is customary to divide the width of the magnetic tape in the cassette into four tracks, with two tracks being recorded or played simultaneously for each so-called "side" of the cassette. These two tracks are separately but simultaneously recorded or played back for stereophonic tapes, or are recorded or played back in common for monophonic tapes.

Since the size of the cassette limits the amount of tape that can be placed in it, there are two ways to increase the recording time of a single cassette without increasing the amount of tape. One way is to increase the number of tracks on the tape and another is to move the tape more slowly. One way to effectively increase the number of tracks on the tape when only monophonic recording and playback are necessary is to use each of the four tracks separately rather than using two of the tracks simultaneously. This means that twice as much information may be stored on the same amount of tape. By reducing the speed of the tape, a proportiately greater amount of material may be stored on the same amount of tape. For example, reducing the speed by one-half doubles the amount of material that can be recorded on the tape while reducing speed to one-quarter that of normal gives four times as much material on the same tape.

Although it sounds like a simple matter to increase the amount of material stored on a cassette tape, numerous problems arise in actually trying to do so.

The cassette track format has been standardized, so any record or playback apparatus that uses a different track arrangement is limited in material that can be used with the equipment unless it is adapted to record and play the standard cassettes as well. Problems have been encountered, however, in designing machines that can change track format so as to selectively use either a single track format or the two track format of the standard cassettes. Applicant is aware of one machine that will play back either a single track or the dual track of the standard cassette but will not record in such single track format. As far as applicant is aware, track format switching is not available in the prior art for both recording and playback.

The speed at which a tape passes the head in a tape record and playback apparatus has a significant effect on the frequency response obtainable for the recorded and played back signal. The standard cassette speed of 4.8 millimeters per second was chosen to give satisfactory high fidelity frequency response for the recorded and played back signals with state of the art tape and magnetic recording and playback heads while at the same time going as slowly as possible to give maximum information storage on the tape. Any reduction in tape speed reduces the frequency response by a like percentage. Cassette playback equipment operating at one half standard speed is currently in use by the U.S. Library of Congress for tape cassettes and playback equipment it supplies for use of the blind. These tapes generally use the spoken word (readings of novels, etc.) so high fidelity is not required. It has been suggested that the speed be reduced even further to one-quarter the normal speed, and some equipment has been modified on a limited basis to test this. However, such equipment has not had satisfactory sound quality to be a viable product in the market place. A major problem, in addition to frequency response, has been control and regulation of the motor at the reduced speed to eliminate variations in speed that can cause wow and flutter.

SUMMARY OF THE INVENTION

According to the invention, a record and playback apparatus for use with cassettes or the like has means for switching from the normal two track cassette format for either record or playback to a single track configuration for either record or play back. It is also preferably equipped with motor speed switching and regulating circuitry, so the apparatus can be operated at normal speed or at a reduced speed of one-quarter that of normal speed. Thus, by using the single track and reduced speed, eight hours of recorded material can be put on a cassette that normally would play for just an hour.

The apparatus includes a multi-gap record and playback head and multi-gap erase head with the gaps of the erase head corresponding to the gaps of the record and playback head. Each gap has a coil associated therewith. A tape transport mechanism passes the magnetic tape from the cassette across the heads, and means are provided, in conjunction with speaker means, microphone means, and a record and playback amplifier, for operating the apparatus to play back material previously recorded or to record material. Means is provided for selectively connecting a single record and playback gap coil to the record and playback amplifier or for connecting all or a selected number of the multiple record and playback head gap coils simultaneously to the record and playback amplifier so that either the single track configuration or double track configuration can be used. When in the record mode, means are provided to selectively operate a single erase gap coil or all or a selected number of erase gap coils, such selected gap coils corresponding to the selected record and playback head gap coils. Means are included to maintain a bias signal and to maintain the record signal at the selected record or playback gap coil or each of the selected gap coils substantially the same regardless of whether a single gap coil or multiple gap coils are connected to the amplifier.

In a preferred embodiment of the apparatus the tape transport mechanism is adapted to pass the magnetic tape across the heads at either normal cassette speed or at one-quarter normal cassette speed and has motor control circuitry to provide motor speed regulation at either speed. Equalization circuitry is provided for the amplifier to give optimum frequency response for recording or playback at either of the selected speeds.

THE DRAWINGS

In the accompanying drawings, which represent the best mode presently contemplated for carrying out the invention.

DETAILED DESCRIPTION OF ILLUSTRATED EMBODIMENT

Although various aspects of the invention, such as head gap configuration switching or motor speed regulation and control, can be used independently in cassette recording and playback apparatus, it is preferred that the head gap switching and the motor speed control switching be combined so that the advantages of both may be obtained in a single tape cassette record and playback apparatus. Further, it is preferred that the apparatus be compatible with standard cassettes or the like and standard record and playback apparatus. It is therefore preferred that the apparatus operate so that at standard cassette speed the standard two-track head format is automatically used and at the one-quarter standard speed the single track head format is automatically used. This is preferred so that the standard cassette tapes may be easily played back or recorded and, as such, will be directly compatible with any other standard cassette record and playback equipment currently available. This is also preferred because it reduces the chance of accidentally erasing a track of information by accidentally recording in double track configuration on a single track tape, since a user is likely to be more careful about speed and track selection when only one switch is used. Thus, all tapes recorded or played at one-quarter speed are in the single track mode, and all tapes recorded or played at standard speed are in the standard two-track mode, and directly compatible with existing cassette equipment.

With the interconnection of the selection of head configuration and motor speed, the respective switching circuitry preferably operates simultaneously in response to switching control circuitry that is operated by a single pole switch, so that, in one switch position, standard speed and standard head configuration are used, while, in the other switch position, quarter-speed and single track head configuration are used. In such an arrangement it is also necessary to switch the record head bias oscillator to change bias levels for recording at standard speed or at quarter speed and to change the record and playback equalization for use at standard speed or at quarter speed.

Figure 1:
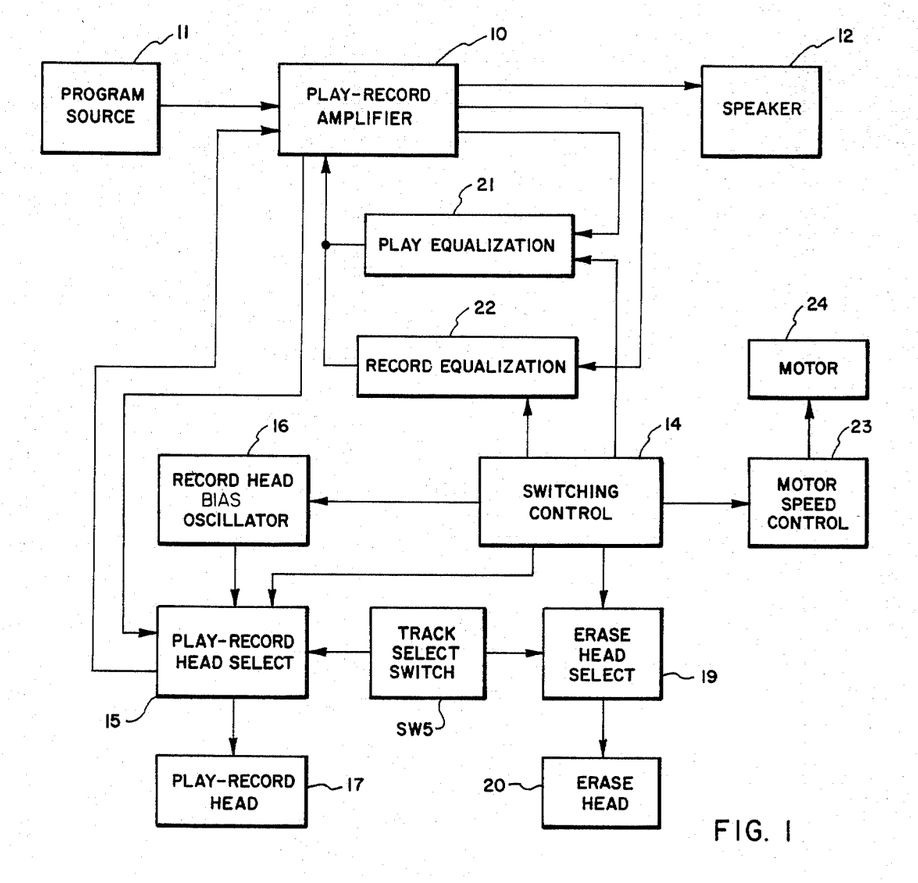
FIG. 1, is a block diagram of the circuitry of the invention.

FIG. 1 shows the various blocks and their interconnection. A power supply is also provided for the apparatus, but is not shown in FIG. 1. The numbering of the boxes in FIG. 1 is carried over to the circuit diagram of FIG. 2, which does include the power supply. Interconnections between the power supply output and the other parts of the circuitry are indicated by a terminal with a "+".

Figure 2:
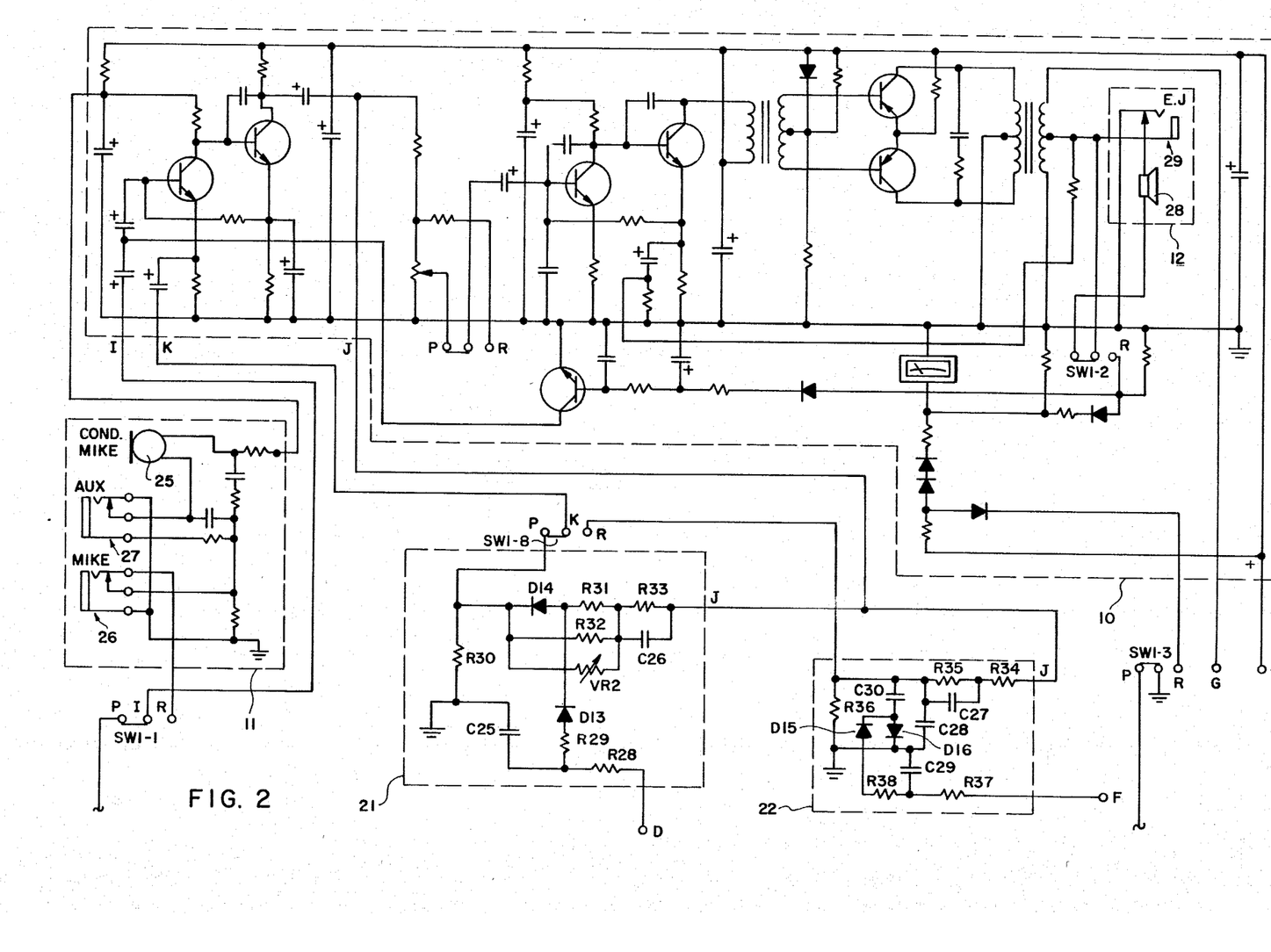
FIG. 2, a circuit diagram of blocks 10, 11, 12, 21, and 22 of FIG. 1.

Play-record amplifier 10 is a standard preamplifier-power amplifier circuit as currently used in existing cassette record and playback units, and particularly in the units manufactured by Atlas Electronics Corp. of Hong Kong and marketed for a time as a model CTR-36. Since this circuitry is standard, it will not be reviewed in detail except as portions of it are explained in conjunction with the special circuitry to be described. Further, any standard amplifier circuitry could be used with the modification and other circuitry described.

Program source circuitry 11 is also standard and is connected to the input of the amplifier circuitry in standard fashion. The program source is used during the recording operation of the apparatus, and during recording, is connected to the input of the amplifier through a pole of the play-record switch, SW1-1 and terminal I. The program source circuitry shown includes a built-in condenser microphone 25, an input 26 for a remote microphone, and an input 27 for an auxiliary program source such as a radio or phonograph. Use of the remote microphone jack or the auxillary input jack disconnects the built-in condenser microphone. Of course, any one or more of the items described could be used alone or in any combination as the program source and it is specifically intended that mere input terminals for an outside program source be included in the definition of program source.

When the apparatus is used in the play mode, switch SW1-1 is connected so that the signal from the record and playback head of the apparatus is connected to the amplifier input through terminal I and the program source circuitry is disconnected.

Speaker means 12 is also standard and connected to the output of the amplifier in standard fashion. The speaker means may be a standard loudspeaker 28 as shown and may have a jack 29 for connection of an earphone, use of the earphone automatically disconnecting the speaker. Also, the speaker means could merely be output terminals for connection of external speakers. The speaker means is connected through a second pole of the play-record switch, SW1-2, so that it is connected to the output of the amplifier in the play mode but is disconnected in the record mode. In the record mode, the output of the amplifier is the signal to be recorded on the tape and is connected directly to the play-record head select circuitry.

Figure 3:
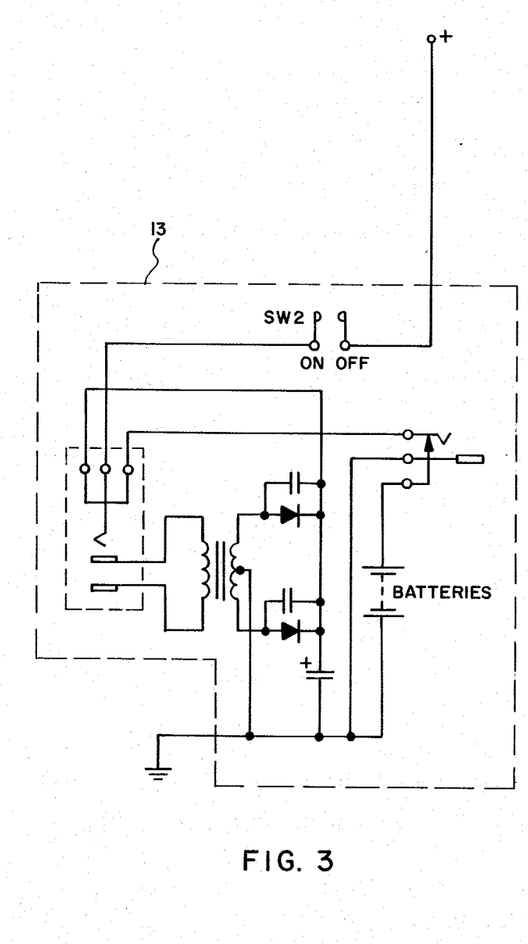
FIG. 3, a circuit diagram of a suitable power supply.

Power supply 13, FIG. 3 (not shown in the block diagram of FIG. 1) is also standard and uses either batteries or an AC power supply with a rectifier to supply power to the circuitry. An on-off switch SW2 is used to connect and disconnect the power supply to and from the remaining circuitry of the apparatus. Any power supply that provides about 6 to 8 volts DC may be used, and, such supply may be external to the apparatus itself, such as in units designed for use in automobiles where the automobile battery is used as the power supply.

The physical appearance and mechanical operation of the apparatus of the invention will generally be identical to that of standard cassette record and playback apparatus, except for the additional switches noted.

Figure 4:
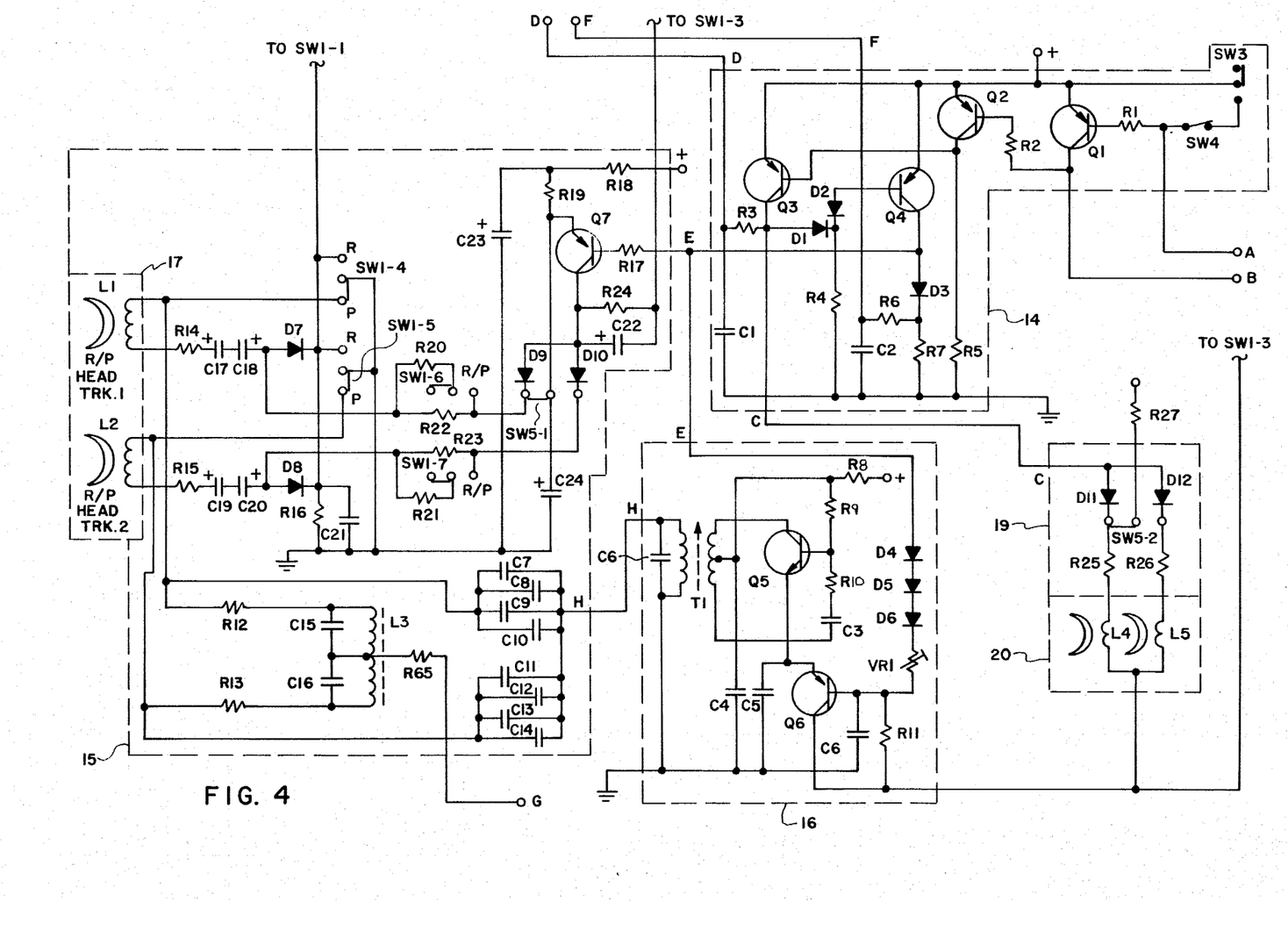
FIG. 4, a circuit diagram of blocks 14, 15, 16, 17, 19, and 20 of FIG. 1.

The track head configuration switching and the speed switching is accomplished by a single pole speed selector switch SW3, FIG. 4, which is additional to the normal switches provided on standard cassette recording apparatus. The speed selector switch is part of the switching control circuitry that produces switching signals for the remaining circuitry, and may be mounted in any convenient position on the apparatus.

In the circuitry shown, switch SW3 is opened for normal operation and closed for quarter speed operation. An additional switch SW4, shown in series with SW3, is part of the fast forward switch. It is normally closed, but, when operated, opens, so that the speed control circuitry operates at normal speed. With the switch in open position, the base of transistor Q1 is connected through terminal A to a portion of the motor control circuit which supplies a voltage of about 1.5 volts less than the power supply line. The power supply is 6 volts so the voltage on the base of transistor Q1 through current limiting resistor R1 is about 4.5 volts. This turns transistor Q1 "on", causing the collector voltage and terminal B to become essentially the supply line or emitter voltage. Actually, the collector voltage will be about 0.2 volts less than the emitter voltage, but for purposes of this circuitry, it can be considered as essentially the same. With Q1 "on", the voltage on the base of transistor Q2 through current limiting resistor R2 is essentially equal to that on the emitter, and Q2 is turned "off" and does not conduct. The collector of Q2 is thus at 0 volts and the base of transistor Q3 is also at 0 volts. The base of Q3 is therefore grounded thru current limiting resistor R5. This turns "on" transistor Q3, whose emitter voltage is 6 volts, thereby causing the voltage on the collector of transistor Q3 and at terminals C and D to be essentially 6 volts. Resistor R3 and capacitor C1 form a filter for the collector output of Q3. The 6 volts on the collector of Q3 is also dropped across diode D1 and resistor R4, which gives a bias on the base of transistor Q4 through diode D2 of 6 volts. This is because the 6 volts on the collector of Q3 is dropped about 0.6 volts across diode D1 and 5.4 volts across resistor R4. Q4 is normally biased to ground by D2 in series with R4. When Q3 is in "on" state however, its collector is essentially 6 volts and it feeds a current to R4 through diode D1, bringing R4 up to 5.4 volts, because there is a 0.6 volt drop across diode D1. The voltage across R4 plus a voltage across diode D2 of 0.6 volts gives a 6 volt bias level on the base of Q4. Q4 is turned "off", giving 0 volts on the collector of Q4 and at terminals E and F.

With switch SW3 in closed position for quarter speed single track operation, the base of transistor Q1 is at the same voltage as the emitter and the transistor is biased to "off" condition. The collector is connected through terminal B to a portion of the motor control circuitry, which supplies a voltage level 1.5 volts less than the power supply line. The voltage on the base of transistor Q2 is thus about 4.5 volts, which turns transistor Q2 "on", bringing its collector to approximately 6 volts. This 6 volt drop is across output resistor R5. This causes a bias level of six volts on the base of transistor Q3, which turns Q3 "off" thereby giving zero volts on the collector of Q3 and at outputs C and D of the switching circuitry. With 0 volts at the collector of Q3 and thus on the base of transistor Q4, transistor Q4 is biased to "on" condition giving a voltage of approximately 6 volts at the collector of Q4. This makes output E essentially 6 volts. Output F is approximately 0.6 volts less because of the 0.6 volt drop across diode D3. The output on terminal F is filtered by the combination of resistors R6 and R7 and capacitor C2.

Thus, the switching control circuitry produces outputs of approximately 6 volts on terminals B, C, and D and zero volts on terminals E and F when switch SW3 is open, thereby indicating normal speed and head configuration, and outputs of approximately 6 volts on terminals A, E, 5.4 volts on terminal F, and zero volts on terminals C and D when switch SW3 is closed, thereby indicating quarter speed and single track head configuration.

Transistors Q1, Q2, Q3 and Q4 may all be of standard 2N4403 type, while diodes D1, D2, and D3 may be of standard IN4148 type.

When the apparatus is operated to play back signals that have been pre-recorded on magnetic tape, the magnetic tape is passed across the record and playback head and electric signals are induced into coils L1 and L2 of the gaps of the record and playback head. These induced signals are fed to the input of amplifier 10 through pole 1 of the record playback switch SW1-1, as previously indicated. When the apparatus is operated to record, record and bias signals are supplied to the coils L1 and/or L2 of the gaps of the record and playback head and a signal is induced onto the magnetic tape by the signals in the coils. The bias signal comes from an AC oscillator and the record signals come from the output of the amplifier.

In record mode, switch SW1-1 is in position to connect the program source to the input of the amplifier. The amplifier amplifies the input signals and produces an output signal that is sent through terminal G to the play record head select circuitry 15. A bias signal is produced by a record head bias oscillator 16 and sent to the record head select circuitry 15 through terminal H. A signal from the switching control circuitry 14, which indicates whether single track or dual track head configuration is desired, is sent to the play-record head select circuitry through terminal C.

The record head bias oscillator 16 has standard oscillator circuitry comprising transistor Q5, resistors R8, R9 and R10, capacitors C3, C4 and C5 and transformer T1. The output of transformer T1 across filter capacitor C6 is the AC bias signal that is sent to the play-record head select circuitry through terminal H.

The amount of AC bias current which is added to the recording signal at the record playback head during recording has an effect on various performance characteristics, such as record and playback level, frequency response, harmonic distortion, etc. It has been found that, at normal speed, the optimum AC current level which gives best overall performance characteristics is a current level of 800 micro amps. At quarter speed recording, it has been found that the optimum AC current level is 400 micro amps. It is therefore necessary to change the level of bias signal when changing from normal speed to quarter speed. The record head bias oscillator is interconnected with the switching control circuitry through terminal E. When in the record mode, poles SW1-3 of the play-record switch are connected so that the collector of Q6 is connected to ground. For normal speed, terminal E has a voltage of zero volts so the base of Q6 is at zero volts. Q6 is thus biased in "on" condition. This means that the supply voltage to the oscillator (between the power supply and the emitter terminal of Q6) is approximately 5 volts. The oscillator is designed to give an output of 800 micro amps at this input value. For quarter speed operation, terminal E has a voltage of approximately 6 volts, which is dropped by diodes D4, D5, D6, variable resistor VR1, and resistor R11 to give a voltage across resistor R11 and on the base of Q6. This causes the voltage between the emitter and collector of Q6 to be about 4 volts and gives a supply voltage to the oscillator of approximately 2 volts thereby dropping the bias current from 800 micro amps to 400 micro amps. Diodes D4, D5, and D6 act as a voltage reference for the base of Q6 to keep the supply voltage to the oscillator constant regardless of variations in supply voltage. Variable resistor VR1 is used to make a factory fine adjustment of the voltage on the base of Q6 and, thus, the voltage supplied to the oscillator.

Transistors Q5 and Q6 may be standard 2N 3704 and 2N 4403 types, respectively, and diodes D4, D5, and D6 may be standard IN 4148 type.

In conventional cassette and similar tape recorders, the record-playback gap coil feed circuit is of a type commonly known as a current drive circuit. This means that a high voltage signal, the bias signal at the output of the oscillator and the record signal at the output of the amplifier, are fed through a high impedance to the coils of the head. In the normal double-track monaural configuration, where two gaps and coils are used, the coils are connected in parallel so as to share the bias and record signal currents. If this type of unit is set up so that one or the other or both coils may be selected, when a single coil is selected, it will carry twice the current than if both coils are selected. Such a change in the bias and record signals has a very serious effect on the recording performance.

It is therefore necessary to provide that the same bias current will flow through a single head coil or each of the head coils regardless of whether a single coil is in use or both coils are simultaneously in use. It is also necessary to provide that the same record signals will flow through a single head coil or each of the head coils regardless of whether a single coil is in use or both coils are simultaneously in use. The signal from the bias oscillator enters the play/record head select circuitry through terminal H and passes through respective sets of capacitors C7, C8, C9 and C10, or capacitors C11, C12, C13 and C14 to head coil L1 or L2 respectively. The record signal from the amplifier output enters the play-record head select circuitry through terminal G and passes to the center of a split coil L3 and capacitors C15 and C16. The signal passes from the center of the coil L3 to one side and through resistor R12 to head coil L1, or to the other side of coil L3, and through resistor R13 to head coil L2. The record signals and bias signals are combined at the head coils. The use of separate resistors and halves of the coil or use of separate coils for the record signals, and the use of separate sets of capacitors for the bias signal, (both correspond to the normal high impedance elements) allows the same record and bias signals to flow through a selected head coil regardless of whether the other head coil is operating.

When in record position, poles SW1-4 and SW1-5 of the playrecord switch open the ends of the coils L1 and L2 respectively to which the record signals are connected and ground the other ends of the coils through resistor R14, capacitors C17 and C18, and diode D7, and resistor R15, capacitors C19 and C20, diode D8, respectively. When SW1-4 and SW1-5 are in the play position, the ends of head coils L1 and L2 to which the record and bias signals are attached are directly grounded and the other ends of the coils are connected through resistor R14, capacitors C17 and C18, and diode D7, and resistor R15, capacitors C19 and C20 and diode D8, respectively, to the input of the amplifier through switch SW1-1. Resistor R16 and capacitor C21 go from the common connection of diodes D7 and D8 to ground. Diodes D7 and D8 act as the track select switch. If the record signals are passing through coils L1 or L2 or the play signals are being induced in coil L1 or L2, the signals will be blocked by diode D7 and/or D8 respectively unless those diodes are biased with a forward current. Thus, unless diode D7 is forward biased, it acts as an open circuit and blocks the current flow through Coil L1. Similarly, unless diode D8 is forward biased, it acts as an open circuit and blocks current flow through coil L2. By selectively forward biasing either diode D7 or diode D8 or both, either coil L1, coil L2 or both coils L1 and L2 are connected to ground in the record mode or to the input of the amplifier in play mode. The selection and forward biasing takes place by either a signal from the switching control circuitry 14 or by a set of poles of a track selector switch SW5-1. In the normal mode, the output of the switching control circuitry at terminal E is zero volts which puts a bias of 0 volts through resistor R17 to transistor Q7. The emitter of transistor Q7 is attached through resistors R18 and R19 to the power supply of 6 volts. With a 0 volt bias on thru R17 to the base of Q7 the transistor is biased to its "on" position so that the emitter voltage is essentially applied to diodes D9 and D10 which then places a positive voltage across diodes D7 and D8 so that they are both forward biased, and both head coils L1 and L2 are connected and operative in the circuit. Additional poles of the play-record switch, SW1-6 and SW1-7, place either resistors R20 and R21 or resistors R22 and R23 respectively, in series with diodes D9 and D7 or D10 and D8 respectively. The change from either resistors R20 and R21 to resistors R22 and R23 is made to optimize the DC bias through diodes D7 and D8 for either the record or playback mode of operation. During the playback mode, resistor R24 and capacitor C22 are connected to ground through the play-record switch SW1-3 and acts as a filter. Capacitor C23 also acts as a filter.

When in quarter speed mode, the output of the switching control circuitry at terminal E is essentially 6 volts which biases transistor Q7 to "off" position. Therefore, diodes D9 and D10 are not forward biased and no current flows through them. The track select switch SW5-1 manually switches the voltage from the emitter of Q7 so that in one position D7 is forward biased and coil L1 is operatively connected to the circuitry or in the other positions so that diode D8 is forward biased and coil L2 is operatively connected to the circuitry. Again, R20 and R21 or R22 and R23 are placed in series with D7 or D8 respectively to optimize the bias for either record or playback modes. Capacitor C24 is a filter capacitor connected to the emitter of transistor Q7.

Transistor Q7 may be of 2N4403 type, diodes D9 and D10 of IN 4148 type and diodes D7 and D8 of IN 4448 type.

When in the record mode, it is necessary to erase the track or tracks to be recorded before they pass the record head gaps. For this purpose erase head select circuitry 19 and erase head 20 are provided. It is important, however, that when recording single track, only the track to be recorded be erased. The erase head select circuitry is connected to the switching control through terminal C. Terminal C is 6 volts when the apparatus is operating at normal speed. This 6 volts causes both diodes D11 and D12 to be forward biased, which in turn causes a current to flow through these diodes, through the respective resistors R25 and R26, and through the respective erase head coils L4 and L5. Coils L4 and L5 are grounded when in the record mode through switch SW1-3.

In the quarter speed mode, the output of the switching control circuitry at terminal C is zero and thus neither diode D11 nor D12 are forward biased. The second pole of the track select switch SW5-2 is connected so that in one position the positive supply voltage is connected through resistor R27 and resistor R25 to erase head coil L4. This causes the single track corresponding to that to be recorded by recording coil L1 to be erased. When switch SW5-2 is in the other position for track two selection, the positive supply is connected through resistor R27 and resistor R26 through erase head coil L5. This causes the single track corresponding to that to be recorded by recording coil L2 to be erased. When the apparatus is in the play mode, the play-record switch SW1-3 opens the circuit through erase head coils L4 and L5 so they become inoperable. Diodes D11 and D12 may be of IN 4148 type.

A magnetic tape head has an output, and required recording input which is not constant with respect to frequency. It is universal practice in cassette and all other types of tape recording equipment to control the voltage gain characteristics of the record and playback amplifier to compensate for the differences in frequency response. Such compensation is generally known as equalization. Thus, where the head output is low at lower frequencies, the gain of the amplifier must be higher to compensate for the low output. In addition, during recording, the recording signal at the higher frequencies must be higher in order to get a useable strength signal on the tape.

In addition to the changes in response with frequency, such changes also occur with tape speed. The frequency where the output begins to drop at quarter speed is one-quarter the frequency where a similar drop occurs at normal speed. Thus, the same equalization that is used at normal speed cannot effectively be used at quarter speed. The equalization circuits must be switched to obtain a properly equalized output from the amplifier or a properly equalized input to the recording head coil for the speed being used.

The initial preamplifier stage of amplifier 10 is of feedback type with the feedback determining the amplification factor of the amplifier. Thus, by changing the elements in the feedback loop of the amplifier, changes in amplification characteristics are achieved. The output of the initial stage of the amplifier is connected to the play equalization circuitry 21 and the record equalization circuitry 22 through terminal J. The output of either circuitry 21 or circuitry 22 is connected to terminal K of the amplifier by poles SW1-8 of the play-record switch.

When in play position, the play equalization circuitry 21 is connected between the output J of the amplifier and the input K of the amplifier as the feedback circuitry. This circuitry is also connected to the switching control circuitry through terminal D. For normal speed operation, the output at terminal D is 6 volts which forward biases diode D13 through current limiting resistors R28 and R29 and filter capacitor C25. This also forward biases diode D14 and causes an output voltage on resistor R30. With diode D14 forward biased, resistor R31 is in parallel with resistor R32 and variable resistor VR2. R31 will generally be a relatively low value resistor compared with R32 so that when diode D14 is forward biased, R31 will reduce the total resistance of the parallel combination of R31, R32 and VR2 to approximately one-quarter the value of the parallel combination of resistor R32 and variable resistor VR2. Variable resistor VR2 is used as the tone control since a reduction in the parallel combination of resistance will reduce the frequency response of the amplifier. When the unit is to operate at quarter speed, the output of the switching control circuitry at terminal D is zero, thus forward biasing neither diode D13 nor diode D14. This cuts resistor R31 out of the circuit so that the resistance is determined by the parallel combination of R32 and VR2. This is designed to be approximately four times the resistance of the parallel combination with R31 included. The parallel combination of R33 and capacitor C26 in series with the parallel combination of R31, R32 and VR2 complete the feedback loop, and together are designed to give the required feedback characteristics.

When in record position, the record equalization circuitry 22 is connected between the output J of the amplifier and the input K of the amplifier as the feedback circuitry. The record equalization circuitry is connected to the switching control circuitry through terminal F. When in normal speed operation, terminal F has an output of zero volts. Neither diode D15 nor diode D16 is forward biased and the feedback loop comprises resistors R34, R35, and R36, and capacitors C27 and C28. When in quarter speed mode, the voltage on terminal F is 6 volts which forward biases diodes D15 and D16 through current limiting resistors R37 and R38. Capacitor C29 acts as a filter. The forward bias of diode D16 effectively places capacitor C30 in parallel with capacitor C28. The value of C30 is such that when placed in the circuitry by conduction of diode D16 the capacitance value of the combination C28 and C30 is increased by a factor of four.

The diodes D13 through D16 may be IN 4148 type.

The motor speed control circuitry is designed to keep the motor speed constant by compensating for changes in the supply voltage, changes in load torque, and changes in temperature. Such control circuitry is included in many of the standard speed cassette record and playback units currently available. The problem comes in trying to control the motor speed accurately at two speeds, particularly two speeds separated by a factor of four. The circuitry to control the motor at standard speed cannot control the motor at quarter speed, so additional circuitry is needed.

Figure 5:
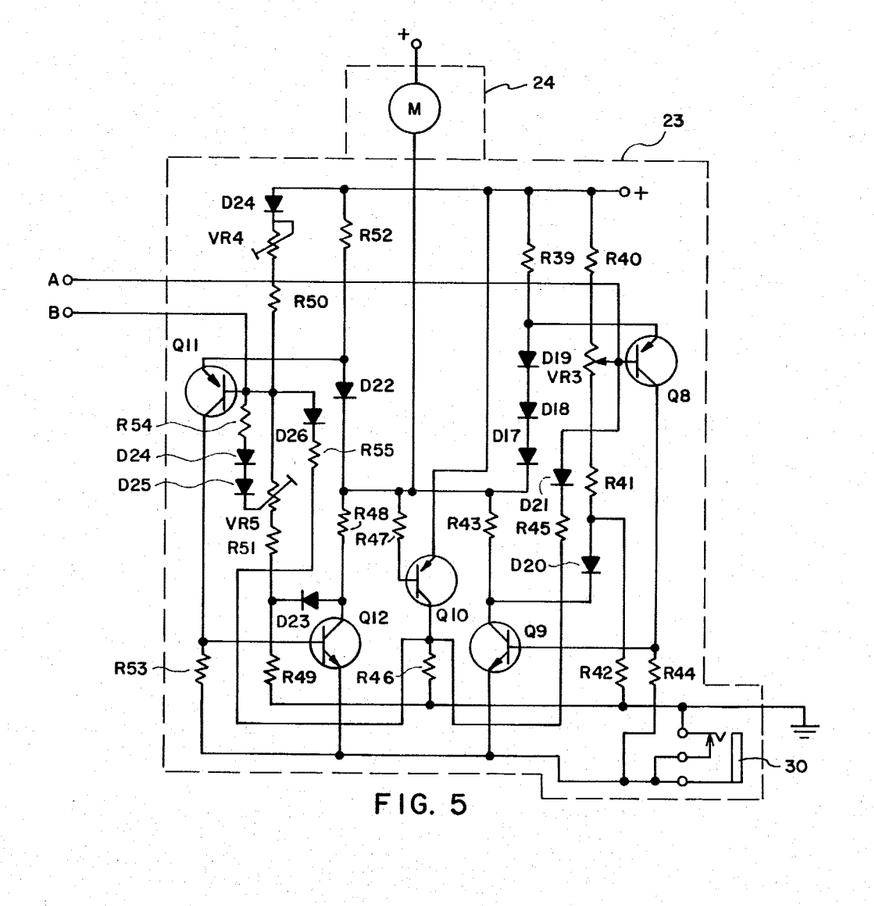
FIG. 5, a circuit diagram of blocks 23 and 24 of FIG. 1.

The switching control circuitry 14 in interconnected with the motor speed control circuitry 23 through terminals A and B. With the selector switch SW3 open for normal speed operation, no voltage is fed to the motor control circuitry through terminal A from the switching circuitry. The point of connection, on the basis of transistor Q8 will normally be at about 4.5 volts as will be explained. This biases transistor Q1 "on" so that terminal B is at essentially 6 volts.

When running at normal speed, the voltage across the motor M, block 24, is about 3 volts. The motor control circuit is connected to the positive supply voltage ground through a jack 30 for remote switching operation from a remote microphone switch, remote foot switch, etc. If nothing is connected to jack 30, the jack forms a closed circuit so that the motor control circuit is connected to ground. A Mabuchi RF510 motor has been found satisfactory. The motor runs at 2400 RPM for normal speed and 600 RPM for quarter speed.

The drop of 3 volts across the motor leaves about 3 volts drop to ground. Diodes D17, D18, and D19 form a 1.8 volt reference which puts the emitter of transistor Q8 at 4.8 volts. The remaining 1.2 volt drop to the source voltage is across resistor R39. With the emitter of Q8 at 4.8 volts, the voltage on the base of Q8 is adjusted through resistors R40, R41, R42, R43, diode D20, transistor Q9, and variable resistor VR3 to be about 4.5 volts thus giving transistor Q8 a forward bias, but not turning it "on" to saturation. With the forward bias, transistor Q8 conducts causing a voltage across resistor R44 which forward biases transistor Q9. This causes transistor Q9 to conduct and draw current through the motor and resistor R43. During normal operation with about a 3 volt drop across the motor, there will be about a 1.8 volt drop across R43 and a 1.2 volt drop across Q9.

Any deviation in current through the motor M or through resistor R43 or transistor Q9 will cause a change in the voltage balance and distribution and thereby cause a change in the bias of transistor Q8, which in turn changes the bias on transistor Q9. This change compensates for the initial change and brings the system back into balance and maintains the motor current and speed constant. Thus, a feedback loop is formed which acts to keep current through transistor Q9 constant.

If a deviation in current through resistor Q9 occurs because of a change in supply voltage, the voltage across R43 and the motor M will change causing the circuit to compensate and bring the current back to its initial level. If a sudden change in load torque is experienced, the motor current will change (the voltage across the motor does not change immediately) causing a voltage change across R43 and an increase in the current through transistor Q9. The circuit will immediately act to keep the current constant. The value of R43 can be adjusted to give a greater or lesser change for a given motor current change so that very good compensation for motor current changes can be obtained and constant speed at various loading torques is assured.

Diodes D17, D18, and D19 that generate the voltage reference are affected by temperature so that the voltage reference changes slightly with changes in temperature. By selecting diode types or by using thermistors in conjunction with generating the voltage reference, the temperature coefficient can be selected to compensate for any change in circuit or motor parameters due to changes in temperature.

To facilitate motor starting, diode D21 and resistors R45 and R46 are connected between the base of transistor Q8 and ground. This causes an extra bias on the base of Q8 under low voltage and high load situations to get the motor and control circuit operating. Once the motor begins moving and the voltage drop across it reaches about 0.6 volt or more, transistor Q10, whose base is connected through resistor R47 so that its base voltage is the supply voltage less the motor voltage, turns "on", essentially shorting resistor R45 and diode D21 to the supply voltage. This eliminates the extra bias on the base of Q8 and reverse biases diode D21 so that this extra bias circuit has no effect on the motor control.

With 6 volts on terminal B from the switching control circuitry and thus on the base of transistor Q11, that transistor is turned "off," which causes transistor Q12 to be turned off. Therefore these transistors and associated circuitry have no effect on the motor control at normal speed.

When speed selector switch SW3 is moved to quarter speed position, terminal A from the switching control circuitry becomes 6 volts which turns "off" transistor Q8 of the normal speed control circuitry, which, in turn, turns "off" transistor Q9. The normal speed control circuitry is thus inoperable.

Terminal B from the switching control circuitry has no voltage generated by the switching control circuitry so does not interfere with the voltage generated by the motor control circuitry.

When operating at quarter speed, the motor requires a voltage drop of about 1 volt. With that small voltage drop, the regulation circuitry described for normal speed is completely unsatisfactory and a number of changes have to be made.

A single diode D22 forms the voltage reference and a diode D23 is placed between resistor R48 and R49 so that it is forward biased and generates a voltage between it and R49 of about 2.1 volts below the supply. This voltage is then divided in half by the voltage divider made up of diode D24, resistor R50 and R51, and variable resistors VR4 and VR5. This gives a voltage of about 1 volt below line voltage to the base of transistor Q11. Since the motor voltage drop is about 1 volt and diode D22 adds about 0.6 volts, the emitter of transistor Q11 is at about 0.4 volts below the supply. This voltage appears across resistor R52. Thus, Q11 is forward biased and generates a voltage across resistor R53 which forward biases transistor Q12. With Q12 forward biased, current flows through the motor, R48, and Q12 to ground. The same type of control loop is set up as has been described with respect to the control circuitry for normal speed. R48 corresponds to R43 in the normal speed control circuitry described, however, R48 is about three times larger in resistance value so that the voltage change for an equivalent motor current change is much larger. This improves the control action of the circuitry with respect to load (torque) changes.

As explained, any change in voltage on the collector of transistor Q12 causes a change in the bias voltage on the base of Q11 which, in conjunction with any voltage change on the emitter of transistor Q11, changes the bias of Q11. This, in turn, changes the bias on the base of Q12 and adjusts the current flowing through the motor. With the small voltage drop across the motor and across resistor R48, adjustments must be made in the circuitry so that small changes in the voltage on the collector of Q12 will cause changes in voltage on the base of Q11 which are significant from a control standpoint. In order to increase the changes on Q11 with respect to the change on the collector of Q12, some additions are made in the voltage divider network which controls the voltage on the base of transistor Q11. Two series diodes D24 and D25, one germanium and one silicon, are added so that they either parallel VR5 or are shorted out by VR5 depending upon the position of the wiper of VR5. Resistor R54 is in series with diodes D24 and D25. When the diodes parallel VR5, they effectively cancel out VR5 because they effectively set up a constant voltage reference across VR5 independent of the current flowing down the potential divider. This gives a much stronger control action with respect to changes in voltage on the collector of Q12 than would otherwise be the case. The setting of VR5 is adjusted to give the optimum control for the circuit, which usually means that it is adjusted to give the lowest possible wow and flutter measurements. Wow and flutter are generally caused by variation in tape speed.

In order to compensate for the effects of temperature change on speed, diode D24 and transistor Q12 are mounted on the same heat sink. When the apparatus is initially started, Q12 is cold, but, after some time it heats up and draws additional current which increases motor speed. When coupled on the same heat sink to diode D24, the simultaneous increase in temperature of D24 will lower its forward voltage which reduces the voltage on the base of Q11 and reduces proportionately the current through Q12 so that the speed remains constant. For further temperature compensation, a thermistor varistor could be added to the voltage divider to compensate for speed changes due to changes in other parameters of the circuit and motor as temperature changes.

The same type of bias boost circuit as described for the normal speed control circuit is provided for the quarter speed control circuit by diode D26, resistor R55 and resistor R46. When the voltage drop across the motor is greater than 0.6 volts, transistor Q10 turns "on" making its collector voltage essentially the source voltage. This reverse biases diode D26 and eliminates the branch from the circuitry so that it has no effect on the control of the motor.

Transistors Q8 and Q11 may be MPS 6563 types Q9 and Q12 may be 2N 2192 types, and Q10 may be a 2N 4403 type. All diodes mentioned for the motor speed control circuitry may be IN 4148 type, except D24 which may be of 1N 34 type.

Figure 6:
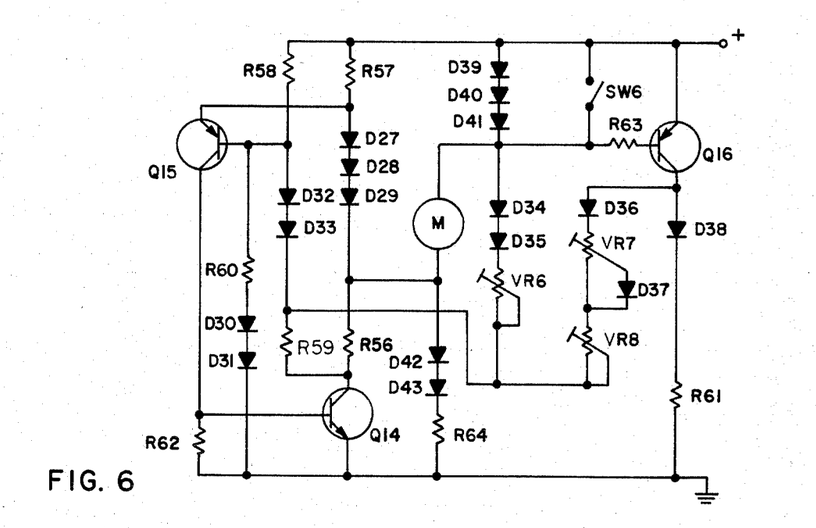
FIG. 6, a circuit diagram of an alternative embodiment of blocks 23 and 24 of FIG. 1.

An alternative speed control circuit, which includes the motor M, is shown in FIG. 6. The basic control circuit is similar to the standard speed control circuit described previously but with the addition of several branches which are switched in or out for either standard or quarter speed operation. The single pole switch SW6 controls the speed. When SW6 is closed, the motor is connected directly to the positive supply voltage. The motor current then flows from the supply, through the motor M, through resistor R56 and transistor Q14. Diodes D27, D28, and D29 form the voltage reference for the emitter terminal of transistor Q15 and, along with resistor R57, supply a voltage to the emitter terminal of Q15. The bias on the base of Q15 is generated by a voltage divider circuit comprising R58, R59, and R60, diodes D30 through D33 and either the circuit branch comprising diodes D34, D35 and variable resistor VR6 or the branch comprising diodes D36, D37 and D38, transistor Q16, resistor R61 and variable resistors VR7 and VR8. When Q15 is forward biased, a voltage is generated across resistor R62 which forward biases transistor Q14. The bias on Q14 controls the motor current as explained for the previously described motor control circuitry. With the switch SW6 closed for normal operation, transistor Q16 is in "off" condition and diodes D34 and D35 are forward biased and, along with variable resistor VR6 and diodes D32 and D33, provide a bias to the base of Q15. The adjustment of VR6 tunes the control circuit for normal speed operation.

When switch SW6 is opened for quarter speed operation, diodes D39, D40 and D41 are switched into the circuit between the supply line and the motor. These three diodes are chosen so that they produce a voltage drop of approximately 2 volts thereby reducing the voltage across the motor from 3 volts to 1 volt. With these diodes in the circuit, the voltage on the base of Q16 through resistor R63 is about 2 volts less than the supply connected to the emitter and therefor the transistor is turned "on". Approximately 6 volts appears across diode D38 and resistor R61. This forward biases diode D36, and variable resistors VR7 and VR8 to form a reference for generation of the base bias of transistor Q15. Adjustment of VR7 with diode D37 tunes the control action of the circuitry in the quarter speed mode. When in quarter speed mode, diodes D34 and D35 are reversed biased so the branch consisting of D34, D35 and VR6 has no affect on the control action of the circuitry.

Diodes D42 and D43 and resistor R64 are provided to facilitate starting of the motor and control circuit by pulling a small bleed current through the motor even when the control circuits are not operating. This bleed current is small and does not affect the control operation of the circuitry.

Transistors Q15 and Q16 may be of MPS6563 type, and transistor Q14 may be of 2N2192 type. All diodes may be of 1N4148 type except diodes D39, D40, and D41, which may be of 1N4002 type.

It will be noted that the circuitry of FIG. 6 is not interconnected with the switching control circuitry. Switch SW6 could be the same switch as SW3 if SW3 is a double throw switch. Thus, for normal operation the switch is closed for the circuitry of FIG. 6 and open for the circuitry of block 14. For quarter speed operation, the switch is opened for the circuitry of FIG. 6 and closed for the circuitry of block 14. The fast forward switch would have to be normally open and placed in parallel with SW6 of FIG. 6 to cause the motor to always operate at normal speed when fast forward is activated. A jack, similar to 31 of block 24, for remote motor operation may be placed in series with motor M and between it and diodes D39, D40, and D41, or can be placed in series with the power supply to the circuitry of FIG. 6 so that all power to the circuitry is controlled remotely.

The circuitry of FIG. 6 may be preferable to that of block 23 in instances where the basic control circuitry can be incorporated into an integrated circuit. In such cases the two branches for tuning the circuit to a desired speed may be connected to the basic circuitry to give desired speed of the motor and desired regulation and control performance.

The circuitry described, with the exception of the circuitry of FIG. 6, is designed to accomplish all switching functions with only a single pole, single throw speed select switch, and a double pole, double throw track select switch in addition to cassette play and record apparatus switches. While the single pole, single throw speed select switch and accompanying electronic switching of the various functions described is preferred in some situation, such as where the speed select switch is positioned to operate automatically in response to the presence or absence of a special cassette feature, in situations where manual switching is used, a multi pole, single or multi throw switch could be used and much of the electronic switching eliminated. Such switching substitutions are numerous and will be obvious to ones skilled in the electronic art. Such switching variations do not depart from the inventive concepts disclosed and claimed herein.

The circuitry described utilizes A.C. record bias and D.C. erase bias. As is well known in the art, A.C. bias could be used for both, D.C. bias could be used for both, or the opposite combination of A.C. and D.C. bias could be used.

The invention has been described as embodied in a total package which includes both head configuration switching and speed switching. While this total package is presently preferred, apparatus incorporating only the head configuration switching aspects of the invention or other aspects of the invention alone could easily be built. Particularly, a single speed machine can be built having head configuration switching so that it operates in either standard double track mode or single track mode, both at standard speed. This configuration, when in single track mode, will double the material stored on a standard cassette and maintain the normal frequency response, if needed.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A record and playback apparatus for use with magnetic tape cassettes or the like, comprising a multi-gap record and playback head, each gap having associated gap coils; a multi-gap erase head, each gap having associated gap coils, the gas of said erase head corresponding to the gaps of the record and playback head; power supply means for supplying power to the apparatus; a tape transport mechanism for passing the magnetic tape from a cassette or the like across said heads at a selected one of a plurality of speeds, said transport mechanism including a drive motor adapted to operate at a selected one of a plurality of speeds and having two terminals for the supply of power thereto; motor speed control circuitry including a first conductive path, one end of which is electrically connected to one terminal of said motor, and the other end of which is electrically connected one terminal of to the power supply; a second conductive path, one end of which is electrically connected to the other terminal of said motor and the other end of which is electrically connected to the other terminal of the power supply; voltage dropping means electrically connected in one of the conductive paths to apply substantially a first value of voltage to said motor to cause said motor to operate at a selected first desired speed; means for bypassing the voltage dropping means to apply substantially a second value of voltage to said motor to cause said motor to operate at a selected second desired speed, back electromotive force (emf) sensing means inserted between the ends of one of said conductive paths, said back emf sensing means adapted to provide an emf signal as a function of the magnitude of a back emf voltage generated by said motor, said emf voltage having a magnitude proportional to the angular speed of said motor; current control means electrically connected between the ends of one of said conductive paths for controlling the amount of current that flows through the motor; feedback means responsive to said emf signal for directing said current control means to control the amount of current that flows through the motor, said current being maintained at a level defined by a speed reference signal, and reference source means for generating a speed reference signal for each of the desired motor speeds, said speed reference signal being utilized by said feedback means to define the appropriate emf level needed to maintain a desired motor speed; a record and playback amplifier; speaker means; program source means; means for operating the apparatus to play back material previously recorded on said cassette's magnetic tape or to record material on said cassette's magnetic tape; means for selectively electrically connecting a single record and playback gap coil to the record and playback amplifier or for electrically connecting all or a selected number of the multiple record and playback head gap coils simultaneously to the record and playback amplifier, so that play signals are transmitted from the coil or coils to the amplifier or record signals are transmitted from the amplifier to the coil or coils; and means for selectively operating a single erase gap coil or all or a selected number of erase gap coils simultaneously when the apparatus is operated to record, said selected erase gap coil or coils corresponding to the selected record and playback gap coil or coils.

2. A record and playback apparatus according to claim 1, wherein the reference source for generating a speed reference signal is a variable source so that the speed reference signal generated may be varied to provide a different speed reference signal for each of the desired motor speeds.

3. A record and playback apparatus according to claim 2, wherein the variable source includes a plurality of resistor networks, at least one of which is electrically connected between the power supply and the feedback means, and at least another of which is switchably electrically connected between the power supply and the feedback means so that switching the switchable network into electrical connection with the circuit changes the speed reference signal, thereby changing the motor speed.

4. A record and playback apparatus according to claim 1, wherein the current control means and the feedback means each include a transistor having a control terminal, and input terminal, and an output terminal, wherein a signal applied to the control terminal of either, serves to control the amount of current that flows between the input and output terminals thereof.

5. A record and playback apparatus according to claim 4, wherein the output terminal of one of the transistors is electrically connected to the control terminal of the other transistor, and wherein the control terminal of the one transistor is fed a signal responsive to the emf signal, said emf signal then controlling, through the one transistor, the amount of current that is allowed to flow through the other transistor and, thus, through the motor.

6. A record and playback apparatus according to claim 1, wherein the volage dropping means is a series connection of diodes.

7. A record and playback apparatus according to claim 1, wherein the bypass means is a switch which when closed, shorts out the voltage dropping means.

8. A record and playback apparatus according to claim 1, wherein the bypass means is coupled to the reference source means so that when the bypass means is activated to bypass the voltage dropping means, the reference source generates one reference signal, while when the bypass means is not activated so the voltage dropping means is not bypassed, the reference source generates a different reference signal.

9. A record and playback apparatus according to claim 1, wherein one of the conductive paths has the voltage dropping means, the back emf sensing means, the feedback means and the reference source generator, wherein there is additionally provided at least one additional conductive path adapted to be connected between the motor and the power supply which includes the bypass means, an additional back emf sensing means, feedback means and reference source, and wherein means is provided to switch the additional conductive path into electrical connection between the motor and power supply in place of the one conductive path having the voltage dropping means, the back emf sensing means, the feedback means, and the reference generator so as to provide a different voltage to the motor and a different speed reference signal to cause operation of the motor at a different one of the desired speeds.

10. A record and playback apparatus for use with magnetic tape cassettes or the like, comprising a multi-gap record and playback head, each gap having associated gap coils; a multi-gap erase head, each gap having associated gap coils, the gaps of said erase head corresponding to the gaps of the record and playback head; power supply means for supplying power to the apparatus; a tape transport mechanism for passing the magnetic tape from a cassette or the like across said head; a record and playback amplifier; speaker means; program source means; means for operating the apparatus to play back material previously recorded on said cassette's magnetic tape or to record material on said cassette's magnetic tape; means for selectively electrically connecting a single record and playback gap coil to the record and playback amplifier or for electrically connecting all or a selected number of the multiple record and playback head gap coils simultaneously to the record and playback amplifier, so that play signals are transmitted from the coil or coils, said means including at least one diode associated with each head gap coil and connected electrically in series with that head gap coil and biasing means to forward bias the diode or diodes associated with the selected head gap coil or coils so that play or record signals which would otherwise be blocked by such diode or diodes are allowed to pass between the selected head gap coil or coils and the amplifier; and means for selectively operating a single erase gap coil or all or a selected number of erase gap coils simultaneously when the apparatus is operated to record, and wherein the means for selectively operating the erase gap coils include at least one diode associated with each erase gap coil and connected electrically in series with that erase gap coil and biasing means to forward bias the diode or diodes associated with the selected erase gap coil or coils to allow an erase signal which would otherwise be blocked by such diode or diodes to pass through the selected erase gap coil or coils, said selected erase gap coil or coils corresponding to the selected record and playback gap coil or coils.

* * * * *